(No Model.)

W. E. DOUGLAS.
COMBINED SCREW HOLDER AND DRIVER.

No. 351,751. Patented Nov. 2, 1886.

Witnesses.

Inventor.
William E. Douglas,
Per
C. H. Woodworth,
Attorney.

UNITED STATES PATENT OFFICE.

WILLIAM E. DOUGLAS, OF COLUMBIA CITY, INDIANA.

COMBINED SCREW HOLDER AND DRIVER.

SPECIFICATION forming part of Letters Patent No. 351,751, dated November 2, 1886

Application filed March 15, 1886. Serial No. 195,344. (No model.)

*To all whom it may concern:*

Be it known that I, WILLIAM E. DOUGLAS, a citizen of the United States, residing at Columbia City, in the county of Whitley and State of Indiana, have invented a new and useful Screw-Holder and Screw-Driver Combined, of which the following is a specification.

My invention relates to the construction and operation of a combined screw holder and driver; and the object of my invention is to provide a means by which a screw may be effectively and securely held on the end of the blade of a screw-driver while the screw is being placed in position for insertion and while it is being driven where desired, the screw being thus held without the necessity of touching it with the hand, thereby enabling the operator to set and insert screws in places where it is or might be very difficult to set or insert them in the usual way without the use of my combined screw holder and driver herein described.

The mechanism by which my object is attained is illustrated in the accompanying drawings, in which—

Figure 1:
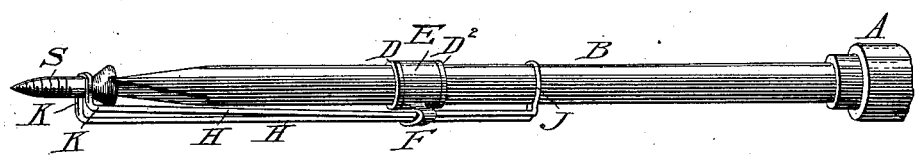
Figure 2:
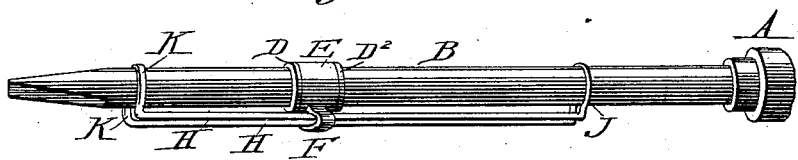
Figure 3:
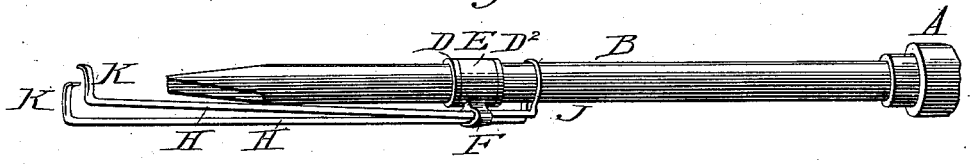

Figure 1 is a general detailed view, in perspective, of the device, showing the screw holder and driver with a screw held in position on the point of the driver-blade ready for use. Fig. 2 shows the device with the clamp or jaws of the holder drawn back from the point of and onto the body of the blade of the driver, so that the latter may be freely used as an ordinary driver. Fig. 3 shows the driver-blade drawn back, leaving the jaws open to receive a screw.

Similar letters refer to similar parts throughout the several views.

A, Fig. 1, is the handle of the screw-driver, and B the blade, both made in about the usual form.

D and $D^2$ show two stops or rings firmly attached to or formed from blade B, and between these two stops the band or collar E moves freely around the blade B. From band E projects the loop or slide F, through which the two equal parts of the holder H H slide freely, the two parts constituting a single piece of metal, which is bent in a free loop around the blade of the driver, as shown at J. The two halves of the holder H H have their outer ends so shaped as to form the jaws K K, (shown as holding-screw S,) and the two halves are sprung apart from where they form the loop J, in such a manner that as they are jointly drawn through slide F toward handle A the jaws K K are brought together by the pressure of slide F simultaneously on both parts H H, as shown. After a screw has been driven far enough to be considered safely fixed in its position, a backward pull on the handle A withdraws the point of blade B from the slot in the screw-head, and at the same time moves loop J toward stop $D^2$, and as the parts H H of the holder move in the same direction through slide F the jaws K K open, and thus release their hold on the screw S.

When in the condition shown by Fig. 2, my invention can readily be used as an ordinary screw-driver, the holder H H, slide F, band E, and stops D and $D^2$ not materially interfering with its free and successful use as such.

As shown at Fig. 3, the device is in proper condition for the insertion of a screw in the jaws for practical use, as before stated.

My invention is specially adapted for use in cases where the places for inserting the screws are difficult of access, and if the material be wood, and no hole has been made in it for the screw to be started in, a slight blow with a hammer on the outer end of handle A will usually set the screw for insertion without further trouble.

All the various parts of my invention may be made as heavy and strong as may be desired. The jaws may be made wide or narrow, as may be deemed advisable, and yet the general plan of construction and operation remain the same in principle as herein set forth.

What I claim as my invention, and desire to secure by Letters Patent, is—

The combination, with a screw-driver having fast rings D $D^2$ and intermediate loose band, E, provided with guide-loop F, of the screw-holder H, having loop J at one end and at the other the spring-jaws K K, all arranged and adapted to be used as described.

WILLIAM E. DOUGLAS.

Witnesses:
O. H. WOODWORTH,
JOEL B. LONG.